March 29, 1949.    G. G. LANDIS ET AL    2,465,596
ARC WELDING SYSTEM
Filed July 6, 1944    3 Sheets-Sheet 1

INVENTORS
GEORGE G. LANDIS and
NORMAN J. HOENIE
BY
Oberlin, Limbach & Day.
ATTORNEYS March 29, 1949.   G. G. LANDIS ET AL   2,465,596
ARC WELDING SYSTEM Filed July 6, 1944   3 Sheets-Sheet 2

INVENTORS
GEORGE G. LANDIS and
NORMAN J. HOENIE
BY
Oberlin, Limbach & Day.
ATTORNEYS March 29, 1949.  G. G. LANDIS ET AL  2,465,596
ARC WELDING SYSTEM Filed July 6, 1944  3 Sheets-Sheet 3

INVENTORS
GEORGE G. LANDIS and
NORMAN J. HOENIE
BY
Oberlin, Limbach & Day.
ATTORNEYS Patented Mar. 29, 1949

2,465,596

UNITED STATES PATENT OFFICE 2,465,596

ARC WELDING SYSTEM

George G. Landis, South Euclid, and Norman J. Hoenie, Cleveland Heights, Ohio, assignors to The Lincoln Electric Company, Cleveland, Ohio, a corporation of Ohio Application July 6, 1944, Serial No. 543,648

9 Claims. (Cl. 315—278)

The present improvements relating as indicated to arc welding methods and apparatus, have more particular regard to the provision of a more efficient construction of transformer suitable for use in A. C. welding systems, as well as to the disposition of circuits in such a system.

In U. S. Letters Patent No. 2,299,329 issued to George G. Landis under date of October 20, 1942, there is disclosed a construction of close-coupled transformer wherein the primary and secondary coils are separated at a point within the contour of the main magnetic circuit and a variable magnetic bridge is provided in the area of separation of said windings. In the specific construction illustrated in said patent this bridge takes the form of a rotor of magnetic material suitably mounted within a hollow stator, and means are provided whereby said rotor may be set to occupy various positions about its axis and thus correspondingly vary the current flow in the secondary coil of the transformer, or in other words, the character of the current delivered to the secondary circuit, which in an arc welding system will of course be the main welding circuit.

One object of the present invention is to provide a transformer of the type just described but which will be considerably more efficient in operation. However it should be noted that the present improvements are not necessarily limited to the particular disposition of the primary and secondary coils as disclosed in the aforesaid patent.

A further object is to provide means whereby the current in the secondary or welding circuit may be automatically varied to meet conditions encountered in the operation of arc welding with alternating current, and particularly to permit striking the arc with the short-circuit impedance set at an adjustable predetermined amount below normal and then automatically increasing such impedance to its normal value after the arc is established.

Otherwise stated, provision is made for considerably increasing the volume of the current at the instant the arc is struck over the volume required to maintain the arc, and that irrespective of what the latter may be throughout the range normally employed in arc welding.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

Figure 3:
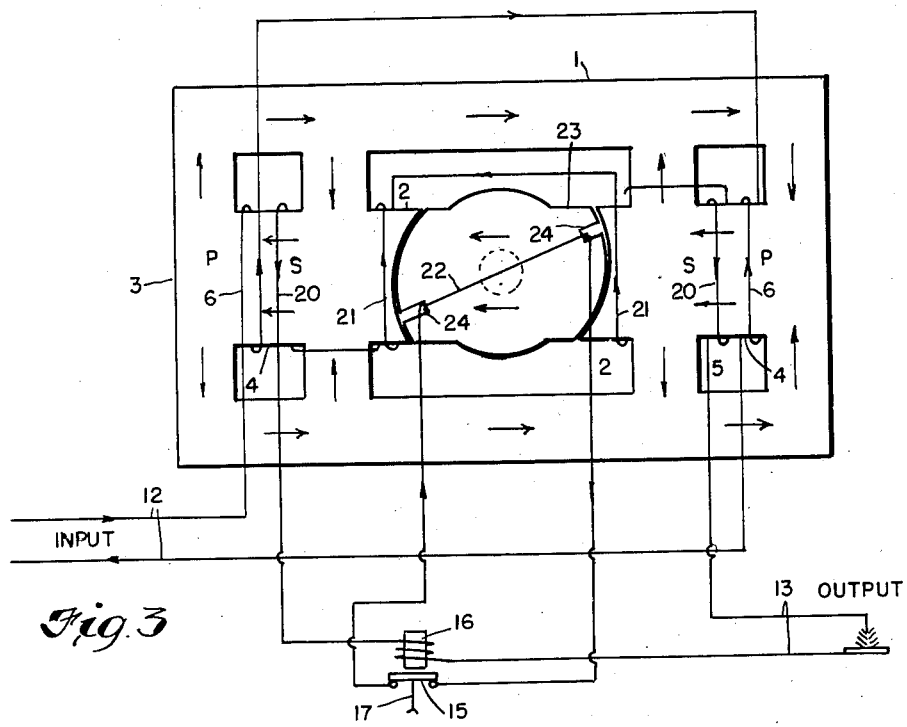
Figure 4:
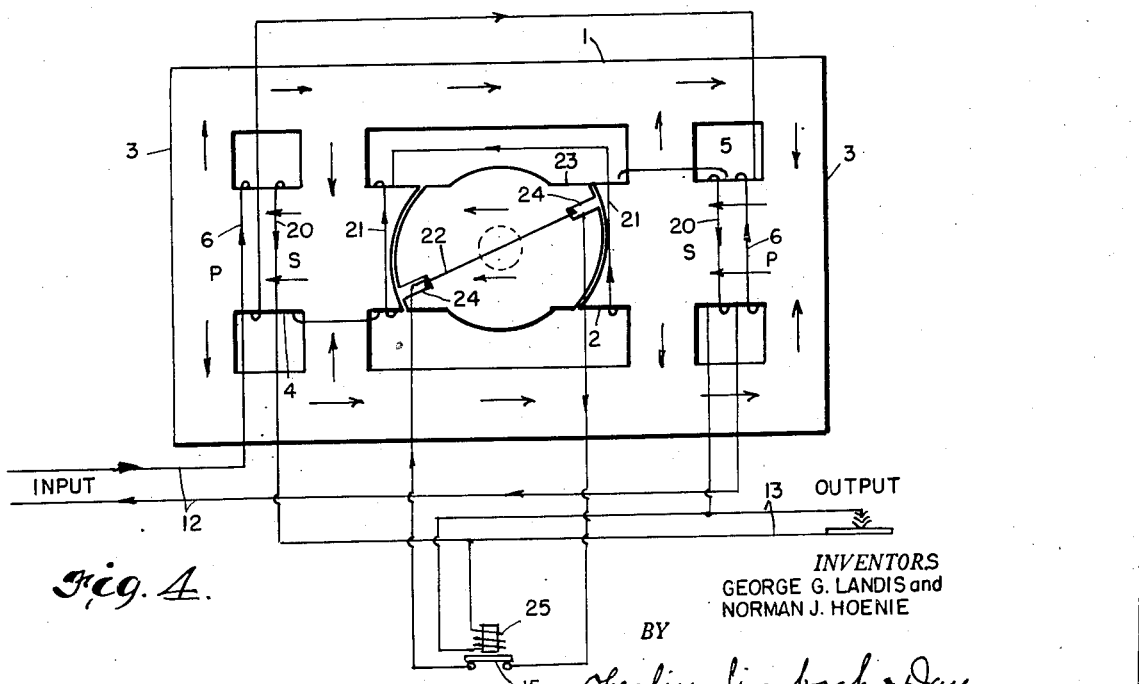

Fig. 3 similarly illustrates still another modified and preferred construction of such transformer;

Fig. 4 similarly illustrates a modification of the construction of Fig. 3; and

Figure 5:
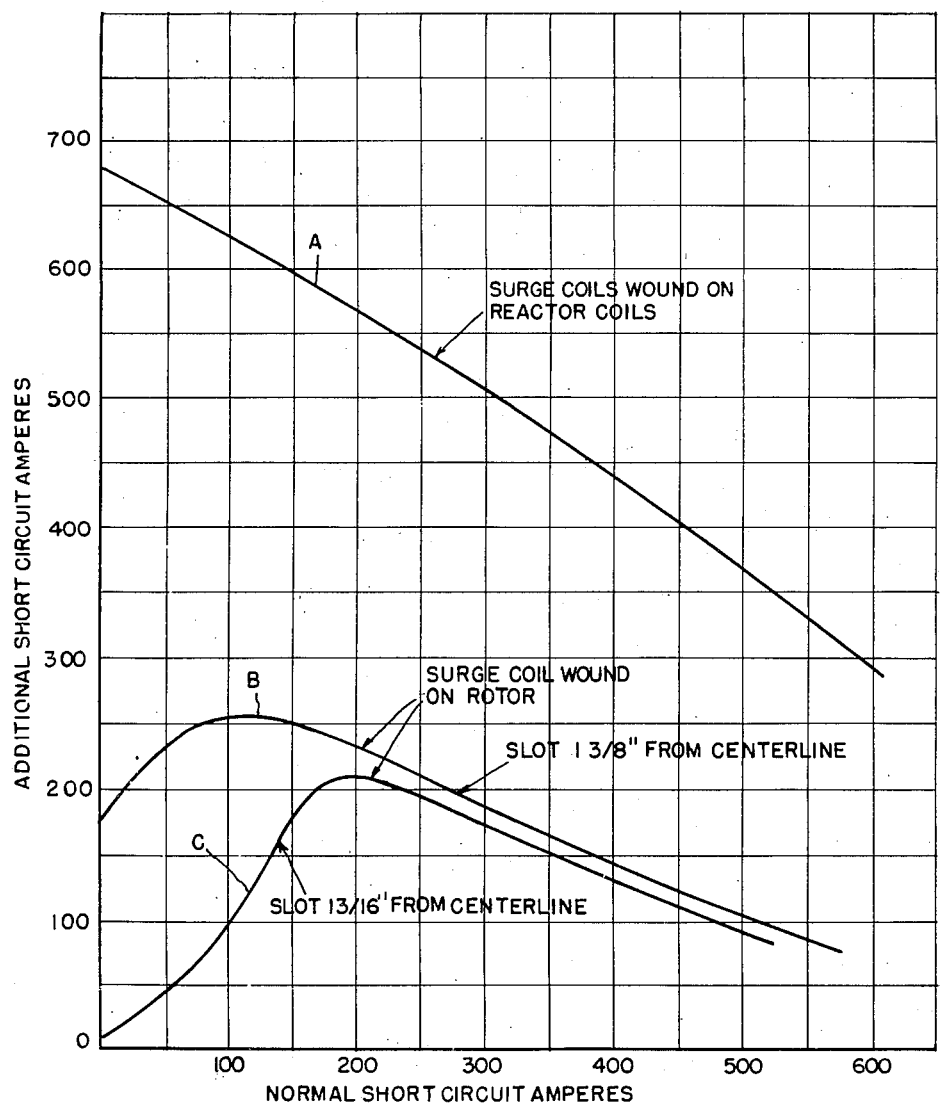

Fig. 5 is a chart showing the comparative results obtained by the use of our improved constructions of transformer in the matter of the volume, i. e. amperage, of the current supplied thereby to the welding circuit.

Figure 1:
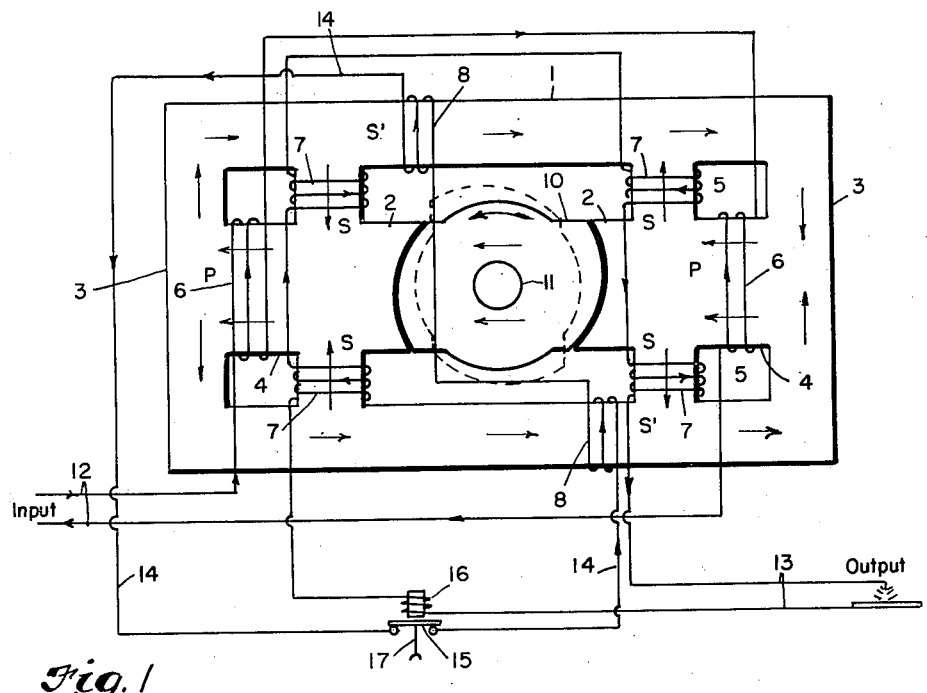
Fig. 1 is a diagrammatic illustration of one construction of transformer embodying our present improvements, such figure also incorporating a wiring diagram wherein such transformer is shown as included in an arc welding circuit employing A. C. current in accordance with our improved method or process.

Referring to the construction of transformer illustrated in Fig. 1, the stator will be seen to comprise a body 1 of hollow form having two similar inwardly directed projections 2, 2. It will be understood that such body, including the supplemental parts thereof presently to be described, will be built up of laminations as usual. Such body includes an extension 3 at each end, spaced from the corresponding end of the body proper and connected therewith by a bridge-like extension 4 aligned with the corresponding inwardly directed projection 2. Accordingly two openings 5, 5 are left between each end of the stator body proper and the adjacent extension 3.

Surrounding each of the bridge-like extensions 4 of the stator body is a primary coil or winding 6, and around each end portion of the stator body which lies on the respective sides of such extensions 4 and inwardly directed projection 2 is placed a secondary coil 7. There will accordingly be four such secondary coils or windings, two adjacent each side of the main stator body and disposed in a plane parallel therewith, while the primary coils 6 will be disposed at right angles to such secondary coils.

In addition to the primary and secondary windings just described, another coil or winding 8 will also be placed about each of the sides of the stator body, such coils lying at right angles to the adjacent secondary coils 7 and being located nearer one such coil than the other to provide necessary clearance for movement of a rotatable bridge member 10 carried by an axial spindle 11 between inwardly directed projections 2, 2 of the stator body.

Such rotatable bridge member 10, like the stator body, is of laminated construction, and spindle 11 which carries the same is suitably mounted so that said member may be rotated and retained in any desired angular position about its axis. Such member, it will be observed, is oblong in form, i. e. longer in one dimension than the other, so that when, as shown in full lines in Fig. 1, it is aligned with the inwardly directed projections 2, 2 of the stator body, it will substantially close the space therebetween. On the other hand, when rotated in a counterclockwise direction from such position (as to that shown in dotted outline) a substantial clearance will be left between the ends of said member and the respective projections. The first of such positions of rotatable bridge member 10 will be referred to hereafter as its closed position and the second as its open position. Obviously it may occupy various intermediate positions as well, and thus constitutes a variable magnetic bridge between the opposite portions of the stator constituted of said projections 2, 2.

The opposed ends of said member and of the projections 2, 2 are desirably formed, as shown, on arcs eccentric with respect to the axis of the member, with the result that immediately upon starting to rotate the latter from its closed position its ends will be slightly separated from the opposed ends of the projections, instead of remaining substantially in contact therewith until the member is rotated to its open position, which would be the case if the faces in question were concentric with such axis. As a result, while close fitting contact between the member and the projections is secured in the former's closed position so as to constitute in effect a continuous bridge between the ends of the stator body, such contact is at once broken when the stator is shifted even slightly from its closed position, and its function as a variable magnetic bridge thus enhanced.

As previously stated, Fig. 1 includes a showing of the arc welding circuit in which the transformer just described is designed to be incorporated. To facilitate understanding of the wiring diagram, the primary coils of the transformer are marked "P" for convenient identification, such coils being connected in series in the usual manner with the supply line 12 marked "In-put"; while the secondary coils, marked "S," are similarly connected in series in the "Out-put" circuit 13, by which the arc welding operation is performed. The supplemental coils, marked "S'," which are disposed alongside the secondary coils, are connected in series in a closed circuit 14 so as to be adapted to induce additional secondary current upon flow of current through the primary coils. Circuit 14, in which such coils S' are included, is normally closed by a switch 15 which is adapted to be opened by a solenoid 16, included in the arc welding or out-put circuit 13. Likewise associated with such switch is a time delay device 17 such as a dash pot or its equivalent, so that a short interval will occur after the arc has been established before circuit 14 is interrupted. In other words, for such short interval following striking of the arc the supplemental coils S' will remain in circuit and induce an additional flow or surge of current through the secondary coils and thus through such welding circuit. Accordingly, the coils in question may be appropriately called surge coils, the time interval during which they are effective being just long enough to permit establishment of the arc, following which the action of the solenoid 16 will be effective to interrupt the circuit 14 through such surge coils.

Figure 2:
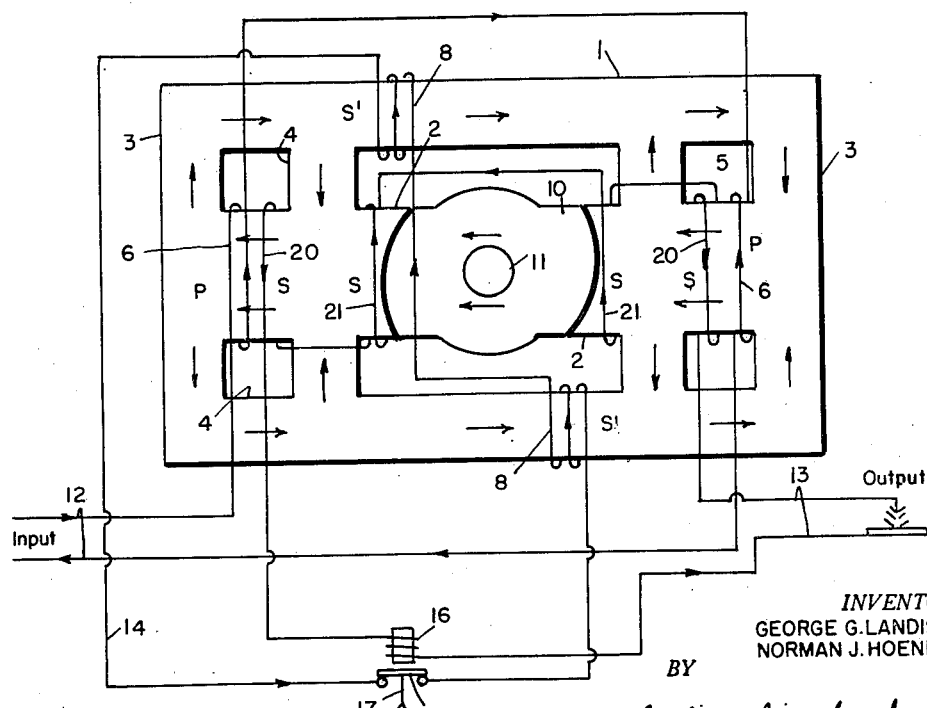
Fig. 2 illustrates in similar fashion to that of Fig. 1 a modified construction of our improved transformer.

The modification in construction, or rather in arrangement of circuits, illustrated in Fig. 2, involves principally a different relative disposition of the primary and the secondary coils from that illustrated in Fig. 1. Accordingly such parts of the transformer as are the same in both constructions are numbered the same in both figures. However, instead of having two secondary coils at each end of the stator disposed at right angles to the corresponding primary coil, a single secondary 20 is placed about the same extension 4 of such stator body which the adjacent primary coil 6 encircles. Furthermore, an additional coil or winding 21, connected in series with each such secondary is placed about the inwardly directed projection 2 of the stator body which is aligned with such extension 4, such winding 21 functioning as a reactance coil.

The two supplemental or surge coils 8 are retained in the same relation as before and are likewise interconnected with the welding circuit just as before. The manner in which the apparatus operates will accordingly be the same as that in the first described construction, the only difference being that due to the different disposition of the secondary coils 20, 21, which permits more convenient assembly of the transformer and has been found also to result in somewhat more efficient performance.

The second modification, or third form of our improved apparatus, illustrated in Fig. 3, follows exactly the construction thus described as illustrated in Fig. 2, except for a change in the matter of the so-called surge coils. The corresponding parts in this figure will accordingly be found to bear the same reference numerals as in Figs. 1 and 2.

However, instead of employing two supplemental or surge coils 8 disposed around the side walls of the stator body, in this third and preferred form of our apparatus we employ a single surge coil 22 which is mounted on a rotatable bridge member 23 which is identical with bridge member 10 of the previous forms except for the provision in the arcuate ends thereof of recesses or notches 24 to receive such coil. As will be noted upon inspection of Fig. 3, these notches are so located that the coil is disposed at an angle to the median line of said member. In other words, in the normal or closed position of the bridge member the coil will lie at a corresponding angle to the longitudinal central plane of the transformer as a whole, including the inwardly directed projections 2. Accordingly, the plane of such coil will at all times intersect the flux path through such projections and the interposed bridge member, the angle between such plane and the longitudinal central plane of the transformer just referred to being increased upon rotation of the member to its open position.

The supplemental or surge coil 22 is an independent circuit just as before, and is controlled by the welding circuit in the same manner as in the case of the coils 8 in each of the previously described constructions. However, the mounting of such surge coil on the rotatable bridge member and its angular disposition produce certain advantageous results not obtainable by the first described arrangement of supplemental or surge coils. It should be explained that the rotatable bridge member 10 or 23 as the case may be will in each case operate substantially as in the previously cited Patent No. 2,299,329. In other words, when the arcing circuit is shorted, current will flow in the secondary coils SS, depending upon the amount of magnetic leakage between the primary and secondary coils, such leakage being controlled by the position of the rotatable member which constitutes a variable magnetic bridge between the inwardly projecting extensions of the stator body. Thus when said member is in closed position, a large percentage of the primary flux will be shunted across the air gap and through the rotor without passing through the secondary coils, giving a minimum output. On the other hand, if the rotatable bridge member be rotated towards its full open position, the air gap between the circuits of said member and the projections on the stator body may be increased to any desired value, the short-circuit current in the secondary winding being at a maximum in full open position of said member.

The construction of the transformer, including arrangement of primary and secondary coils or windings, illustrated in Fig. 4, is identical with that illustrated in the preceding Fig. 3 just described; however, instead of employing a series time delay relay to control the switch in the circuit which includes the supplemental or surge coil 22, a sequence relay is utilized. In other words, while the switch 15 in the circuit in question is solenoid-controlled in form as before, there is no time delay device connected with the solenoid 25, and the latter instead of being connected in series in the welding circuit is connected across the leads which carry the current from the secondaries to the point where the arc is struck.

The operation of this modified construction of relay is as follows: When the arc circuit is open the relay is held open because of the open circuit voltage across the terminals of the relay coil or solenoid 25. At the instant the arc is struck such coil is deenergized, the switch 15 closed and the coil short-circuited, giving high initial current. However, as soon as the arc is established such relay coil is again energized and opens the switch. As a result the time that it takes for the switch to open and thus cut out the supplemental or surge winding of the transformer is not determined by any time delay device, the only delay involved being that which is inherent in a relay of the type in question.

Referring now to the difference in disposition of supplemental or surge coil 22 of Fig. 3 and corresponding coils 8 of Figs. 1 and 2, while the latter induce increased flow of current desired to insure the striking of the arc, the amount of such increase compared with the current employed in the normal welding operation is greater in the lower range than in the higher range of current volume thus normally employed, as determined by the setting of the rotatable bridge member 10. In other words, the amount of such increase becomes progressively less as the volume of the normal welding current is increased, as shown by curve A on the chart, Fig. 5. On the other hand, by disposing such supplemental or surge coil as in Fig. 3 so as to intersect the lines of force tending to pass through the rotatable member 23, while the value of the surge current in relation to the normal welding current will somewhat decrease in the higher ranges of the latter, such decrease is not nearly so great, as shown by curves B and C on the chart, Fig. 5.

In this chart the curves just referred to are plotted to show the additional short-circuit current against the normal short-circuit current produced by the inclusion of supplemental or surge coils of the transformer in the manner hereinbefore described. Curve B, which shows such additional short-circuit current in the modified construction illustrated in Figs. 3 and 4, will of course vary depending upon the angle at which the surge coil on the rotor is disposed in relation to the center line of such rotor. To illustrate this an additional curve C has been plotted on the chart to show the effect where the slot in the rotor lies at a relatively smaller angle to such center line.

By way of further explaining the curves on this chart, a normal short-circuit current is selected, e. g. 100 amperes, as the current at short-circuit on the standard machine without the surge coil. In the case where the surge coil is wound around the rotor at the relatively small assumed angle to the center line of the latter, the initial surge current will be an additional 100 amperes, or 200 amperes total at this point. While in the case where the winding is disposed at a greater angle to the center line, as illustrated in Figs. 3 and 4, an additional 250 amperes will be provided, or a total short-circuit current of 355 amperes. In like manner the curve A has been plotted using values obtained by short-circuiting machine with the surge coil wound directly on the reactor coils shorted out completely. In this case for the same setting of the welding machine, that is at 100 amperes normal short-circuit current, the additional surge current provided will be 625 amperes, giving a total short-circuit current of 725 amperes. However, as shown on the chart, this curve drops sharply and continuously so that the amount of additional short-circuit amperage provided in upper welding ranges is very considerably less than in the lower ranges. On the other hand, where the surge coil is wound on the rotor, the rate of such dropping off of additional short-circuit amperage, as illustrated by the flatter character of curves B and C, is very considerably less. This is particularly desirable in the case of the lower currents such as are used in welding thin gauge metal, since a high surge current would tend to burn through the metal.

The use of a single supplemental or surge coil or winding around rotatable member which serves to form a magnetic bridge between the inwardly directed projections on the stator body while illustrated in Fig. 3 only in relation to primary and secondary coils or windings disposed in said stator body as in Fig. 2, may be equally well utilized in the similar transformer illustrated in Fig. 1 where such primary or secondary coils or windings are differently arranged than in said Fig. 2. In other words, in either of the two modified constructions illustrated in Figs. 1 and 2, the use of a supplemental normally shorted winding carried by such rotatable member will be effective, irrespective of the position of the latter to induce an increased flow of current in the secondary windings or coils.

While the bridges which divide the spaces enclosed by the respective extensions of the stator body have been described as aligned with the corresponding inwardly directed projections, between which the rotatable bridge member is mounted, it will be understood that this does not necessarily imply such alignment in the strict meaning of the term. In particular, the bridges in question may be wider than such inwardly directed projections and they do not need to lie on the same center line. Also while the rotor is referred to as constituting a variable magnetic bridge, its primary function is to act as a part of the main reactor circuit rather than as a secondary circuit to by-pass flux from the main circuit.

Claims to certain features, and particularly features of transformer construction disclosed herein, have been divided out of this application and are presented in our co-pending application filed August 7, 1944, Serial No. 548,342. It will accordingly be understood that the designation herein of certain windings as "transformer windings" is not intended to limit their use to a transformer as such.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:

1. In an electric arc welding system, the combination with primary and secondary transformer windings respectively connected with a source of current and the welding circuit, of an independent, normally closed circuit, a supplemental winding included in said independent circuit and adapted to induce additional flow of current in said secondary winding and thus in said welding circuit, and a time delay relay in said welding circuit adapted to open said independent circuit and thus cut out said supplemental winding after a predetermined interval of current flow in said welding circuit.

2. In an electric arc welding system, the combination with primary and secondary transformer windings respectively connected with a source of current and the welding circuit, of a variable magnetic bridge controlling the amount of magnetic leakage between said windings, an independent, normally closed circuit, a supplemental winding disposed in the path of such magnetic leakage and effective, irrespective of the position of said bridge, to induce an increased flow of current in said welding circuit, and a time delay relay in said welding circuit adapted to open said independent circuit and thus cut out said supplemental winding after a predetermined interval of current flow in said welding circuit.

3. In an electric arc welding system, the combination with a transformer having a stator body of hollow form and primary and secondary windings encircling such stator and respectively connected with a source of current and the welding circuit; of a movable bridge member within said stator cooperating therewith to provide a variable magnetic shunt; an independent normally closed circuit; a supplemental winding included in said independent circuit, disposed in the path of magnetic leakage between said primary and secondary windings and effective, irrespective of the position of said member, to induce an increased flow of current in said secondary winding; and a time delay relay in said welding circuit adapted to open said independent circuit and thus cut out said supplemental winding after a predetermined interval of current flow in said welding circuit.

4. In an electric arc welding system, the combination with a transformer having a stator body of hollow form and primary and secondary windings encircling such stator and respectively connected with a source of current and the welding circuit; of a rotatable bridge member within said stator cooperating therewith to provide a variable magnetic shunt; an independent normally closed circuit; a supplemental winding included in said independent circuit, disposed in the path of magnetic leakage between said primary and secondary windings and effective, irrespective of the position of said member, to induce an increased flow of current in said secondary winding; and a time delay relay in said welding circuit adapted to open said independent circuit and thus cut out said supplemental winding after a predetermined interval of current flow in said welding circuit.

5. In an electric arc welding system, the combination with a transformer having a stator body of hollow form and primary and secondary windings encircling such stator and respectively connected with a source of current and the welding circuit; of a rotatable bridge member within said stator cooperating therewith to provide a variable magnetic shunt; an independent normally closed circuit; a supplemental winding included in said independent circuit, said supplemental winding encircling said stator adjacent said member and being effective, irrespective of the position of said member, to induce an increased flow of current in said secondary winding; and a time delay relay in said welding circuit adapted to open said independent circuit and thus cut out said supplemental winding after a predetermined interval of current flow in said welding circuit.

6. In an electric arc welding system, the combination with a transformer having a stator body of hollow form and primary and secondary windings encircling such stator and respectively connected with a source of current and the welding circuit; of a rotatable bridge member within said stator cooperating therewith to provide a variable magnetic shunt; an independent normally closed circuit; a supplemental winding included in said independent circuit, said supplemental winding comprising two series connected parts respectively encircling portions of said stator adjacent said member and being effective, irrespective of the position of said member, to induce an increased flow of current in said secondary winding; and a time delay relay in said welding circuit adapted to open said independent circuit and thus cut out said supplemental winding after a predetermined interval of current flow in said welding circuit.

7. In an electric arc welding system, the combination with a transformer having a stator body of hollow form and primary and secondary windings encircling such stator and respectively connected with a source of current and the welding circuit; of a rotatable bridge member within said stator cooperating therewith to provide a variable magnetic shunt; an independent normally closed circuit; a supplemental winding included in said independent circuit, said supplemental winding comprising two series connected parts respectively encircling opposite sides of said stator adjacent said member and being effective, irrespective of the position of said member, to induce an increased flow of current in said secondary winding; and a time delay relay in said welding circuit adapted to open said independent circuit and thus cut out said supplemental winding after a predetermined interval of current flow in said welding circuit.

8. In an electric arc welding system, the combination with a transformer comprising a stator body of hollow form having an inwardly directed projection and primary and secondary windings encircling such stator adjacent such projection and respectively connected with a source of current and the welding circuit, of a rotatable member within said stator cooperating with such projection to provide a variable magnetic shunt, a supplemental, normally shorted winding carried by said member and effective, irrespective of the position of the latter, to induce an increased flow of current in said secondary winding, and a time delay relay in said welding circuit adapted to cut out said supplemental winding after a predetermined interval of current flow in said welding circuit.

9. In an electric arc welding system, the combination with a transformer comprising a stator body of hollow form having an inwardly directed projection and primary and secondary windings encircling such stator adjacent such projection and respectively connected with a source of current and the welding circuit, of a rotatable member within said stator cooperating with such projection to provide a variable magnetic shunt, a supplemental, normally shorted winding carried by said member at an angle to the median line of the latter, and a time delay relay in said welding circuit adapted to cut out said supplemental winding after a predetermined interval of current flow in said welding circuit.

GEORGE G. LANDIS.
NORMAN J. HOENIE.

REFERENCES CITED

The following references are of record in the file of this patent:

UNITED STATES PATENTS

| Number | Name | Date |
| --- | --- | --- |
| 1,351,030 | Fahnoe | Aug. 31, 1920 |
| 1,953,519 | Tritschler | Apr. 3, 1934 |
| 2,009,787 | Rypinski | July 30, 1935 |
| 2,032,705 | Klinkhamer | Mar. 3, 1936 |
| 2,305,153 | Fries | Dec. 15, 1942 |